United States Patent [19]
Luke et al.

[11] 3,807,298
[45] Apr. 30, 1974

[54] PLATE FILTER PRESSES

[75] Inventors: William George Luke; Garcie John Rickard, both of Cornwall, England

[73] Assignee: English Clays Lovering Pochin & Company Limited, St. Austell, Cornwall, England

[22] Filed: Jan. 28, 1972

[21] Appl. No.: 221,561

[30] Foreign Application Priority Data
Feb. 2, 1971  Great Britain ...................... 3757/71

[52] U.S. Cl. .................. 100/122, 210/140, 210/225, 210/230
[51] Int. Cl. ......................... B30b 9/06, B01d 25/32
[58] Field of Search ........... 100/122, 198, 197, 196, 100/195, 199, 208, 206, 296, 295, 297; 210/224, 225, 230, 140, 226, 227, 228, 229, 231

[56] References Cited
UNITED STATES PATENTS
| | | | |
|---|---|---|---|
| 924,131 | 6/1909 | Behrend | 210/230 X |
| 3,331,511 | 7/1967 | Kurita | 100/198 X |

*Primary Examiner*—Leon G. Machlin
*Attorney, Agent, or Firm*—Larson, Taylor and Hinds

[57] ABSTRACT

A plate filter press and a process employing the plate press are described. The plate filter press includes an axial feed system for supplying material to be filter pressed to cavities in the filter plate units and pneumatic means allowing automatic discharge of filter cake from the press and automatic separation of each of the series of filter plate units.

18 Claims, 13 Drawing Figures

PLATE FILTER PRESSES

BACKGROUND OF THE INVENTION

This invention relates to an apparatus and to a process for reducing the liquid content of wet, particulate solid material and, more particularly but not exclusively, is concerned with a plate filter press.

Two types of plate filter press are in general use, namely the plate and frame press and the recessed plate press. In a recessed plate press, each filter plate unit contains a recess which is formed by a raised periphery, on each side of the filter plate, standing proud of the drainage surface of the filter plate; the thickness of a filter cake formed in such a plate filter press is therefore twice the depth of the recess. For high pressure filtration, the plates of a recessed plate filter press are generally circular in shape. A general survey of filter presses is given in a book entitled "Process Engineering Technique Evaluation Filtration," edited by H. K. Suttle, and published in 1969 by Morgan Grampian.

SUMMARY OF THE INVENTION

According to one aspect of the present invention there is provided a plate filter press which includes (i) a series of filter plate units which are supported on and adapted to move along a carriageway, wherein each filter plate unit includes a filter plate having an annular recess on a face thereof, a filter element secured to said face of the filter plate, one or more ducts connecting the filter element on said face of the filter plate with an air inlet at one side of the filter plate unit, and means for introducing a material which is to be filter pressed into cavities formed by the co-operation of the annular recess of each filter plate unit with a contiguous filter plate unit; (ii) means for applying pressure to material within said cavities whereby, in use, liquid can be expressed from the material in said cavities through said filter elements; (iii) a conveyor system extending parallel with said carriageway; (iv) filter cake release means adapted to be conveyed along said conveyor system and to connect the air inlet of each filter plate unit with a supply of compressed air so that a filter cake can be dislodged from one or more of the walls of the cavity in which it has been formed; and (v) a filter plate unit-release device adapted to be conveyed along said conveyor system and to separate each filter plate unit from the adjacent filter plate unit.

Generally, each filter plate unit of the series will be formed with an annular recess on both faces thereof and will be provided with a filter element secured to each face of the filter plate.

The carriageway can comprise a pair of plate support rails one on each side of the plate filter press.

There will generally be provided a pair of identical conveyor systems one on each side of the series of filter plate units upon each of which conveyor systems there can be conveyed a filter plate unit-release device. The conveyor system can comprise, for example, a substantially horizontal bar upon which the filter plate unit-release device can move under the action of a chain driven hydraulically by a motor.

DESCRIPTION OF THE PREFERRED EMBODIMENTS

Each filter plate unit of the series preferably includes two extension members, located one on each side of the filter plate units, which are adapted to slide along the carriageway and to support the weight of the filter plate units. The two extension members are preferably located above the centre of gravity of the filter plate units. The air inlet at the side of the filter plate unit is preferably provided in an extension member. Advantageously there are two air inlets, one in each of the two extension members. Each air inlet preferably communicates, via a duct within the body of the filter plate, with an outlet in one face of the filter plate, the arrangement being such that the air inlet in one of the extension members communicates with an outlet in one face of the filter plate, while the air inlet in the other extension member communicates with an outlet in the other face of the filter plate. The outlets can be in the form of one or more ports, for example located in a plug member, in one face of the filter plate, or alternatively the outlets can be in the form of one or more arcuate or circular grooves extending about the filter plate, for example a circular groove located within an annular member in the body of the filter plate.

In one embodiment of the invention the filter plate unit-release device comprises first and second members which are constructed so that they can engage with a filter plate unit and move the same along said carriageway. The first and second members can each be pawls which are pivoted at one end thereof and free at the other end thereof, the pawls being arranged so that their free ends confront one another and can engage with an extension member of a filter plate unit. The two pawls are preferably arranged so that the free end of each pawl can co-operate with one side of the extension member of a filter plate unit in a manner such that movement of the pawls along the conveyor system effects movement of the filter plate unit along the carriageway. The pawls are advantageously spring-biased so that relative movement of each pawl about its pivot takes place against the action of the spring. The two pawls will generally be constructed so that, when travelling in one direction along said conveyor system, the first of the two pawls can override the extension members, and so that, when the device is moving along the carriageway in the opposite direction, the second of the two pawls can override the extension members of the filter plate units. The operation of the filter plate unit-release device can be controlled automatically by, for example, a cam-controlled switch unit.

Advantageously, the filter cake release means and the filter plate unit-release device are each adapted to co-operate with each filter plate unit in turn. The filter cake release means adapted to connect the air inlet of each filter plate unit in turn with a supply of compressed air can be incorporated in the filter plate unit-release device. For example, if each of the filter plate units is provided with an inlet for compressed air in an extension member at the side thereof, and if the filter plate unit-release device comprises first and second members in the form of first and second pawls, one of the pawls can be provided in its free end with an outlet for compressed air which, in operation, co-operates with the air inlet on the extension member of the filter plate unit to complete a compressed air flow line.

According to another aspect of the present invention, there is provided a plate filter press which includes (i) a series of filter plate units which are supported on and adapted to move along a carriageway, wherein each filter plate unit includes (a) a filter plate having an annular recess on a face thereof, the annular recess of each filter plate unit co-operating with a contiguous filter plate unit to form a cavity in which a material to be filter pressed can be treated; (b) a filter element secured to said face of the filter plate; (c) means for supplying a material to be filter pressed to said cavity; (d) means for conveying filtrate from the filter element to the exterior of the filter plate units; and (e) a central aperture; (ii) means for applying pressure to material within said cavities whereby, in use, liquid can be expressed from the material in said cavities; (iii) a conveyor system extending parallel with said carriageway; (iv) filter cake release means adapted to be conveyed along said conveyor system and to dislodge each filter cake from one or more of the walls of the cavity in which it has been formed; and (v) a filter plate unit-release device adapted to be conveyed along said conveyor system and to separate each filter plate unit from its adjacent filter plate unit, wherein the means for supplying a material to be filter pressed to the cavities within the series of filter plate units comprises an axial duct within the series of filter plate units formed by the co-operation of the central apertures of contiguous filter plate units in the series and, extending therefrom, a plurality of superficial grooves formed in the surface of that part of the filter plate unit located between the central aperture thereof and the or each annular recess thereof, the superficial grooves forming passageways between said axial duct and said cavities.

Generally, each filter plate unit of the series will be formed with an annular recess on both faces thereof and will be provided with a filter element secured to each face of the filter plate.

The carriageway can comprise a pair of plate support rails one on each side of the plate filter press.

There will generally be provided a pair of identical conveyor systems one on each side of the series of filter plate units upon each of which conveyor systems there can be conveyed a filter plate unit-release device. The conveyor system can comprise, for example, a substantially horizontal bar upon which the filter plate unit-release device can move under the action of a chain driven hydraulically by a motor.

Each filter plate unit of the series preferably includes two extension members, located one on each side of the filter plate units, which are adapted to slide along the carriageway and to support the weight of the filter plate units. The two extension members are preferably located above the centre of gravity of the filter plate units. The air inlet at the side of the filter plate unit is preferably provided in an extension member. Advantageously there are two air inlets, one in each of the two extension members. Each air inlet preferably communicates, via a duct within the body of the filter plate, with an outlet in one face of the filter plate, the arrangement being such that the air inlet in one of the extension members communicates with an outlet in one face of the filter plate, while the air inlet in the other extension member communicates with an outlet in the other face of the filter plate. The outlets can be in the form of one or more ports, for example located in a plug member, in one face of the filter plate, or alternatively the outlets can be in the form of one or more arcuate or circular grooves extending about the filter plate, for example a circular groove located within an annular member in the body of the filter plate.

It is preferably for the superficial grooves to be formed on both faces of the filter plate unit. Furthermore, it is advantageous for two contiguous filter plate units to be disposed so that each superficial groove of one of the filter plate units co-operates with the corresponding superficial groove of the other of the filter plate units to form a duct of symmetrical cross-section. The superficial grooves are preferably radially disposed between the central aperture of a filter plate unit and the or each annular recess thereof. It has been found advantageous to employ four or six superficial grooves on each face of a filter plate unit.

The filter plate of each filter plate unit is advantageously provided with outer spacing means disposed peripherally of the filter plate, and inner spacing means disposed centrally of the filter plate around the central aperture of the filter plate unit. The outer spacing means will generally be in the form of annular members, and the inner spacing means in the form of hub members. The inner and outer spacing means can act as spacing, locating and sealing members between two contiguous filter plate units. When a filter plate unit is provided with inner spacing means and outer spacing means as described above, there is an annular recess on each face of the filter plate unit which is constituted by the annular gap between the inner spacing means and the outer spacing means. With this arrangement, the superficial grooves which extend between the annular recess and the central aperture of a filter plate unit will be formed on the surface of the inner spacing means.

The means for conveying filtrate from the filter element to the exterior of the filter plate unit can consist of one or more small apertures in either one face or both faces of the filter plate; these aperture(s) communicate, via one or more conduits within the body of the filter plate, with one or more drainage ports on the periphery of the filter plate units. It has been found advantageous to employ a drainage plug which is located in the body of the filter plate, the drainage plug being provided with a number of drainage ports; these drainage ports preferably serve one face of the filter plate unit only. Alternatively, the drainage ports can be in the form of acruate or circular grooves or narrow annular channels. One or more apertures, and/or drainage plugs, are preferably located in the lower half of the filter plate, for example at a point along a radius which, when the filter plate unit is held in its operational position, makes an angle of 45° with the vertical.

Generally, there will be provided two filter elements each of which extends over one face of the filter plate. If the filter plate unit includes inner spacing means and outer spacing means, each filter element can be annular in shape, the outer edge of the annular filter element being clamped, e.g. by resilient ring seals, between the filter plate and the outer spacing means and the inner edge of the filter element being clamped, e.g. by resilient ring seals, between the filter plate and the inner spacing means. The or each filter element can comprise a backing cloth (e.g. of nylon mesh) and a filter cloth. The nature of the filter element will generally depend upon the pressure at which the filter press is operated; at high pressures it has been found that the thickness and porosity of the backing cloth tend to be controlling factors governing the rate of flow of filtrate away from the filter cloth. A backing cloth consisting of a nylon mesh of 0.020 inches in thickness and having a gauge of 22 threads per inch has been found to be suitable for use at operating pressures of around 1,000 pounds per square inch (p.s.i.).

The invention also provides a process for reducing the liquid content of a wet, particulate material, which process comprises (i) feeding under pressure a wet, particulate material which is to be filter pressed to the cavities within a series of filter plate units in a plate filter press of the invention; (ii) applying a pumping pressure which is in the range of from 200 to 1,500 pounds per square inch to the material within said cavities so as to express liquid therefrom and to form a filter cake in said cavities; (iii) separating each filter cake thus formed from one or more of the walls of its respective cavity; and (iv) separating each filter plate unit from its adjacent filter plate unit.

In a preferred embodiment of the process of the invention the wet particulate material to be filter pressed in fed to the cavities of a series of filter plate units in a plate filter press of the invention at a pressure in the range of from 100 to 150 pounds per square inch (p.s.i.) for a period of about 3 minutes, after which the pumping pressure is increased to a value in the range of from 200 to 1,500 p.s.i., preferably from 750 to 1,200 p.s.i. for example over a period of about 2 minutes. Thus it is preferable for a period of about 5 minutes to elapse before the maximum operating pressure within the plate filter press is attained.

The filter cakes can advantageously be separated from one or more walls of their respective cavities in turn; similarly, each filter plate unit can be separated from its adjacent filter plate unit in turn.

The discharge of each filter cake from the wall of its cavity and the separation of each filter plate unit from its adjacent filter plate unit in the series are advantageously achieved by directing one or more first blasts of air through an air inlet in the side of the filter plate unit, via appropriate ducts within the filter plate unit, in a direction such that an end plate or the filter plate which has just undergone a discharging action is moved away from the remaining filter plates, thereby exposing the filter cake on the filter element of the endmost filter plate unit, and then by directing one or more second blasts of compressed air through an air inlet on the other side of the filter plate unit, via appropriate ducts within the filter plate unit, into the cavity formed between the endmost filter plate unit and the adjacent filter unit thereby dislodging the exposed filter cake. It has been found preferable to employ two first blasts of air and two second blasts of air, the initial blast in each case being at a relatively high pressure and the following blast being at a relatively low pressure. This arrangement prevents excessive distortion and wear of the filter elements.

For a better understanding of the invention, and to show how the same can be carried into effect, reference will now be made, by way of example, to the accompanying drawings in which.

Figure 1:
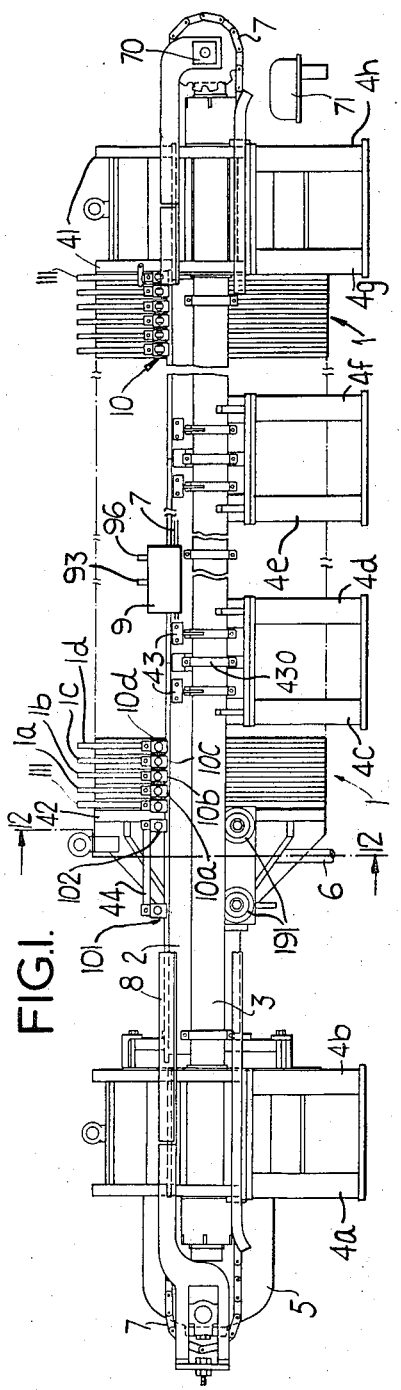
FIG. 1 shows diagrammatically a plate filter press.

Where appropriate in the drawings, similar parts of the plate filter press which recur along the length of the plate filter press are indicated by a number followed by a letter, the letter indicating the location of each part in relation to the other similar parts; and where similar parts are located on both sides of the plate filter press they are distinguished by unprimed and primed references, the unprimed references referring to parts of the plate filter press which occur on that side of the plate filter press which is shown in FIG. 1.

Referring to the drawings, the plate filter press comprises a series 1 of filter plate units 1a et seq., the individual filter plate units being supported on and adapted to move along a carriageway which includes plate support rails such as that indicated as 2, which in turn are supported by and clamped to, by clamps 43, tie bars such as that indicated as 3 (see FIG. 1). The tie bars 3 are supported by pairs of mounting columns 4a and 4a' to 4h and 4h' to which they are rigidly secured by clamps such as that shown at 430. Between two pairs of the mounting columns, 4g and 4g' and 4h and 4h' (at one end of the plate filter press) there is supported a rear end member 41. Means in the form of a hydraulic ram 5 for applying pressure to the filter plate units is mounted on two pairs of mounting columns 4a and 4a', and 4b and 4b' (at the other end of the plate filter press). The piston of the hydraulic ram 5 engages a cross head member 42 which is slidably mounted on the tie bars 3 by means of rollers 191 and plates 198 and 199 (see FIG. 12). The cross head member 42 and the rear end member 41 each contact respective end plates 111. Each end plate 111 is a filter plate unit whose end facing surface is flat and unobstructed. The two end plates 111 are located one at either end of the series 1 of filter plate units. A pipe 6 communicates with a central aperture formed in the cross head member 42. The cross head member 42 has a circular captive O-ring seal (not shown) on its inward-facing surface disposed about the central aperture therein; the rear end member 41, which does not have a central aperture, is also provided with a circular captive O-ring seal in a position corresponding to that of the cross head member 42. The rear end plate 111, which is adjacent to the rear end member 41, is provided with two stop members which extend one from each side thereof.

Figure 5:
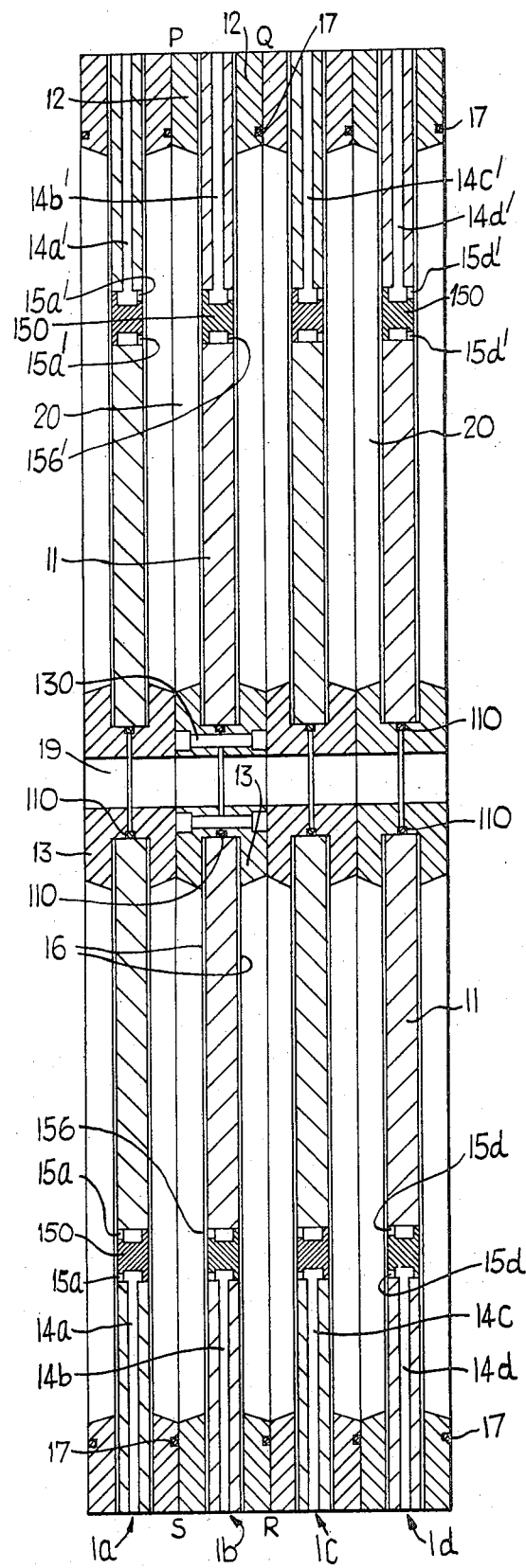
FIG. 5 is a diagrammatic section, along the line 5—5 of FIG. 7, through a series of four circular filter plate units.

There is shown in FIG. 5 a section through a series of four circular filter plate units 1a, 1b, 1c and 1d. A single filter plate unit is enclosed by the line PQRS and comprises a filter plate 11; outer spacing means in the form of two annular members 12 one on either face of the filter plate 11; inner spacing means in the form of two hub members 13 one on either face of the filter plate 11; ducts, e.g. 14b and 14b' for the supply of compressed air from a first port on an extension member, e.g. 10b (see FIG. 1), of the filter plate unit to plug member such as 150 which is formed with second ports, e.g. 15b and 15b'; a filter element 16; an O-ring seal 17 in a captive groove in one of the annular members 12; and an O-ring seal such as 110 in a captive groove located between the two hub members 13 adjacent to the filter plate 11. The hub members 13 of a single filter plate unit are held together by bolts located in recesses 130. The annular members 12 may be secured to the filter plate 11 by one or more bolts passing through the filter plate from one annular member 12 to the other. Alternatively, each annular member 12 can be secured to the filter plate 11 independently of the other annular member 12, this arrangement allowing the filter elements 16 on either side of the filter plate to be removed independently of each other. The inner and outer spacing means act as spacing, locating and sealing members between two adjacent filter plate units. Two adjacent filter plate units, when held together, define therebetween annular cavities such as 20. The inner spacing means are located partly within a central aperture formed in the filter plate 11, and themselves are formed with central apertures 19. Each filter plate unit has an extension member 10, e.g. 10b and 10b', extending from each side thereof (see FIG. 7). The central apertures 19 within the filter plate units communicate, via the central aperture in the cross head member 42, with the pipe 6.

A conveyor system is provided which includes, on either side of the plate filter press, a support member 8 which is mounted on the plate support rail 2, and an endless chain 7. The conveyor system also includes a hydraulically driven motor 70 and a cam-controlled switch unit 71. The support member 8 is L-shaped in section; on each side of the plate filter press, the endless chain 7 passes over the flat, horizontal foot of the L-shaped support member 8. Two identical combined filter cake — and filter plate unit — release devices 9 are provided, one on each side of the plate filter press. Each device 9 is adapted to be conveyed along the conveyor system on its side of the filter press by the endless chain 7 within the L-shaped support member 8. In FIG. 1, the series 1 of filter plate units is shown under compression from the hydraulic ram 5. For convenience, the device 9 is shown further to the right of the figure than would be the case at this stage of the operational sequence.

Figure 2:
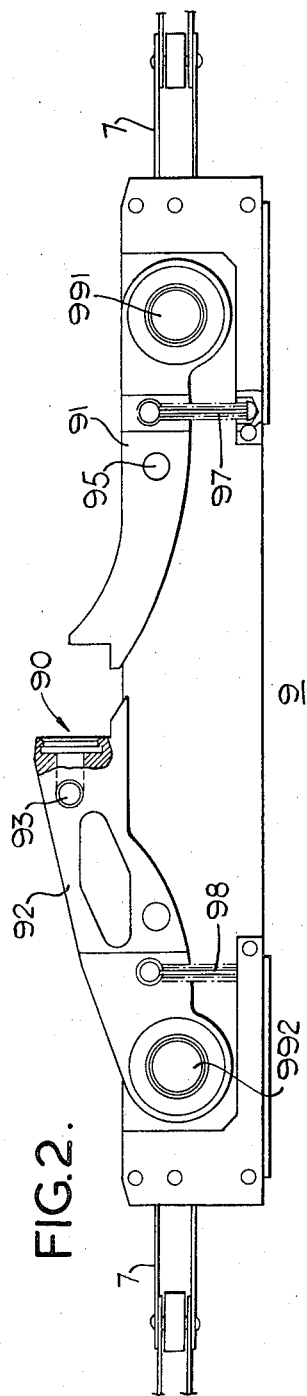
FIG. 2 shows a plan view of a part of the plate filter press shown in FIG. 1.

Referring now to FIG. 2, each combined filter cake — and filter plate unit — release device 9 is supported in a rectangular box (see FIG. 1) which is mounted longitudinally on the endless chain 7, the arrangement being such that the device 9 is slidably located on the support member 8 which is mounted adjacent to, but externally of, the plate support rail 2. That side of the rectangular box which faces the filter plate units is open. Each device 9 comprises two members in the form of two spring-biased pawls, 91 and 92, which can pivot at one end thereof about pivots 991 and 992 respectively against the action of spring 97 and 98 respectively. The ends of the pawls 91 and 92 remote from the pivots 991 and 992 respectively will hereinafter be referred to as "free ends"; the free ends of the pawls 91 and 92 confront one another and can engage the extension member 10 (see FIGS. 1 and 12) of a filter plate unit. The two pawls are arranged so that the free end of each pawl can co-operate with one side of the extension member 10 of a filter unit in a manner such that, when the chain-driven device is moved, the filter plate unit will also move. The two chains 7 (one on each side of the plate filter press) are coupled together so that when the pawls 91 and 92 of each of the two devices 9 co-operate with the extension members of a filter plate unit, movement of the chains enables the filter plate unit to be moved along the plate support rails 2. The pawl 92 of each device 9 is adapted at 93 to receive a compressed air line and contains an outlet 90 in its free end for compressed air. That surface of the pawl 92 of each of the devices 9 which faces the filter plate units is constructed so that, when the two devices 9 move from that end of the plate filter press near to the rear end member 41 towards the cross head member 42, each pawl 92 can engage slidably the end surface of the extension member of a filter plate unit and extend across the gap between adjacent side extension members of two contiguous filter plate units. This ensures that the pawl 92 is retained in a position such that it is pivoted in a clockwise direction (as viewed in FIG. 2) about the pivot 992 against the action of the spring 98 and is held in such a position during the motion described above. A guide rail 44 is provided between two foreshortened extension members 101 and 102 located on the cross head member 42 and extends in a direction parallel to the support member 8. The guide rail 44 extends up to a position just short of the point where the extension member 10a of the first filter plate unit will be located.

Figure 3:
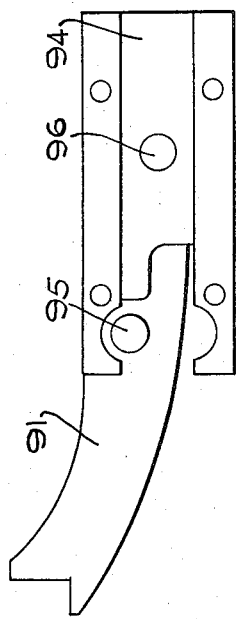
FIGS. 3 and 4 illustrate two positions of a part of the device shown in FIG. 2.
Figure 4:
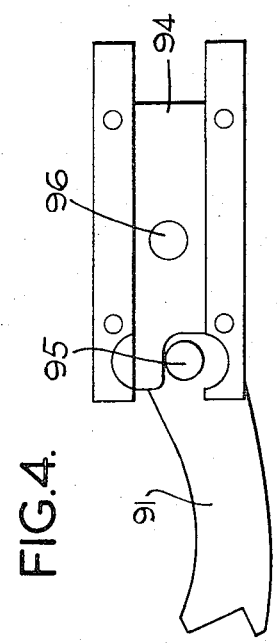

Referring next to FIGS. 3 and 4, there is shown the pawl 91 in a position in which it is free to move against the action of spring 97 about pivot 991 (FIG. 3) and in a locked position in which now such movement is possible (FIG. 4). The device 9 includes a locking device which comprises a channelled plate 94 slidably located over the pivot 991 of the pawl 91 and underneath a cover plate which forms part of the box visible in FIG. 1 (not shown in FIGS. 2, 3 and 4) which serves to protect the parts of the device 9. The channelled plate 94 is shaped at one end so as to engage a locking pin 95, which is situated on the upper surface of the pawl 91, when the pawl 91 is fully biased outwardly from the filter plate units against the action of spring 97, thereby preventing the pawl from engaging with an extension member 10 of a filter plate unit. The channelled plate 94 has an actuating pin 96 mounted on its upper surface which projects through a slot in the cover plate. Longitudinally mounted on the cover plate is a locking bar (not shown). The locking bar is adapted so that, when the combined filter cake — and filter plate unit — release device 9 has separated all the filter plate units in the series and has almost reached the end of the support member 8 remote from the hydraulic ram 5 (see FIG. 1), a stop member on the rear end plate 111 secured to the rear end member 41 moves the locking bar which in turn moves the actuating pin 96, thereby urging the channelled plate 94 to engage the locking pin 95 and thus lock the pawl 91. There is provided on the stop member a projection which is shaped so as to ensure that the pawl 91 is urged into the fully closed position before the stop member actuates the locking bar. At the end of the support member 8 remote from the back end member 41 is a further stop member which is adapted so that, when the pawl 91 reaches the stop member, the locking bar is actuated so as to release the pawl 91 in readiness for tne next cycle.

Figure 6:
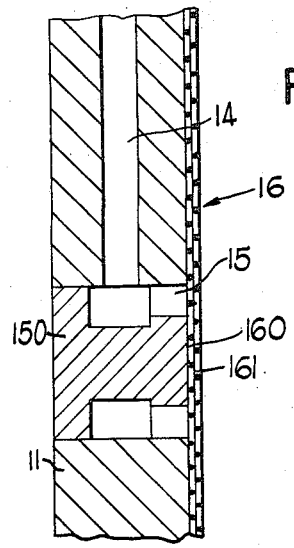
FIG. 6 is an enlarged view of part of one of the filter plate units shown in FIG. 5.

Referring next to FIG. 6, there is shown in detail that part of a filter plate 11 which contains the member 150. It can be seen that the filter element 16 comprises a backing cloth 160, which is made of nylon mesh which is 0.020 inches in thickness and has a gauge of 22 threads per inch. Over the backing cloth 160 there is stretched a filter cloth 161. The nature of the filter cloth will generally depend on the type of material to be filtered pressed.

Figure 7:
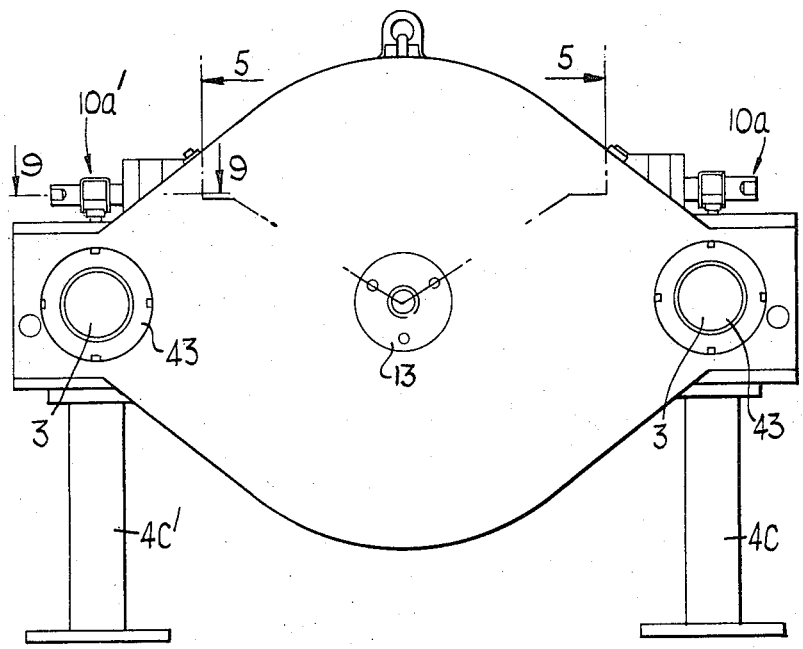
FIG. 7 is a diagrammatic front elevation of the filter plate unit shown in FIG. 5 in position in the plate filter press shown in FIG. 1.

Referring next to FIG. 7, there is shown a diagrammatic front elevation of a filter plate unit of the type shown in FIG. 5 in position in the plate filter press shown in FIG. 1. The two extension members 10a and 10a' are clearly visible, as in one of the two members 13.

Figure 8:
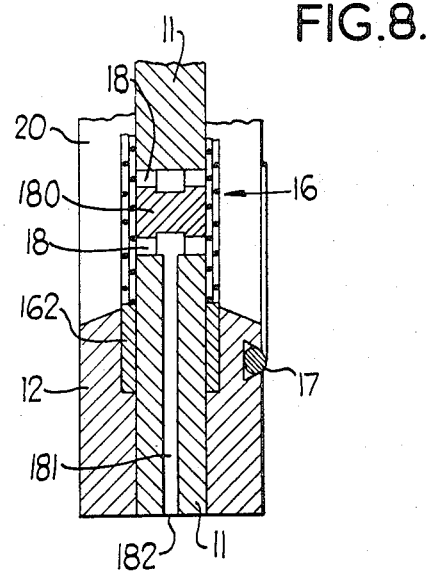
FIG. 8 is an enlarged sectional view of part of one of the filter plate units shown in FIG. 5.

Referring next to FIG. 8, there is shown in greater detail a part of a filter plate unit, which is constructed as shown in FIG. 5, which part is disposed at the bottom of the filter plate unit and includes the means by which filtrate can pass from the cavity 20 between two adjacent filter plate units to the exterior of the series of filter plate units. The filter element 16, which is held in position by resilient ring seals such as that indicated as 162, covers filtrate drainage ports 18 in a member 180, which drainage ports communicate, via a radial channel 181, with a port 182 on the periphery of the filter plate unit. In the embodiment shown in FIG. 8, the drainage ports 18 communicate with the cavities on both sides of the filter plate 11; in a different embodiment, the member 180 is provided with ports 18 which communicate with the cavity on one side only of the filter plate 11. While this latter arrangement recessitates the provision of a larger number of radial channels 181 and members 180, it has the advantage of preventing filtrate from passing between adjacent cavities in the series of filter plate units. In addition, the annular members 12 may be provided with a V-shaped groove on that surface thereof which abuts the seals 162.

Figure 9:
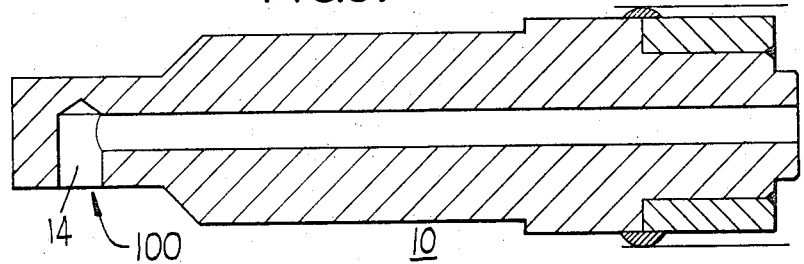
FIG. 9 is a section on the line 9—9 of FIG. 7 of an extension member.

Referring next to FIG. 9, there is shown on an enlarged section through an extension member 10 taken along the line 9—9 of FIG. 7. This view shows an extension member 10 in which there is the channel 14. This channel terminates in a compressed air inlet in the form of a first port 100.

Figure 10:
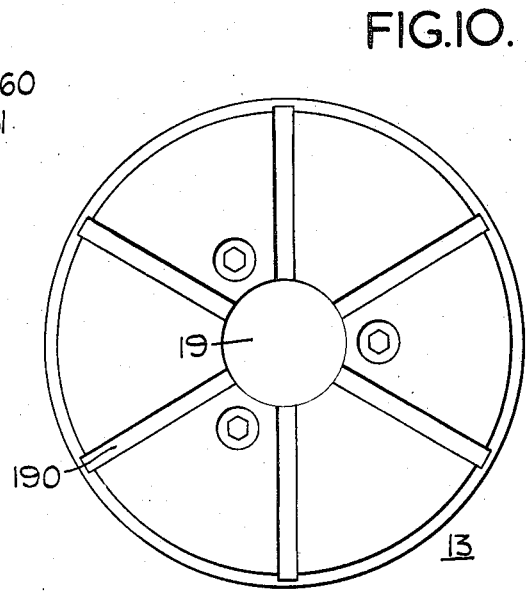
FIG. 10 is a diagrammatic front elevation of a part of the filter plate unit shown in FIG. 5.
Figure 11:
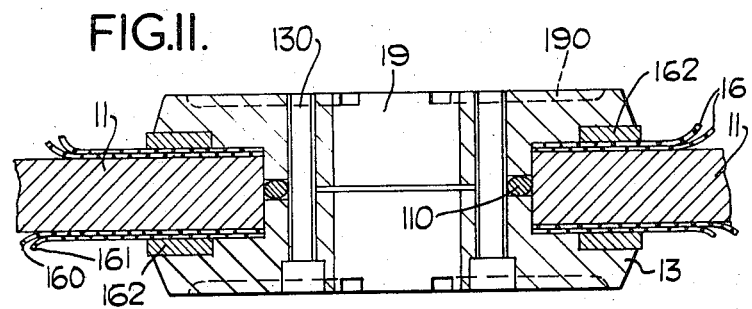
FIG. 11 is an enlarged sectional view of a part of the filter plate unit shown in FIG. 5.

Referring next to FIGS. 10 and 11, there is shown the inner spacing means 13 of the filter plate unit of FIG. 5. The inner spacing means 13 comprises two circular, axially bored, peripherally-recessed metal hubs which are bolted at 130 in a back-to-back relationship so that the circular inner edge of a filter plate is located in the channel formed by the co-operating recesses. The filter element 16 is clamped between the inner end portion of the filter plate and the surfaces of the recesses of the member 13 by resilient ring seals 162. The inner edge of the filter plate 11 is sealed against the inner surface of the recess by a resilient O-ring seal 110. A number of superficial radial grooves 190, six in this embodiment, are formed in the outer surfaces of the spacing means 13 and communicate with the central aperture 19. The hub members 13 in adjacent filter plate units are positioned so that the superficial radial grooves of adjacent hub members co-operate to form channels of circular section which communicate with the central aperture 19.

Figure 12:
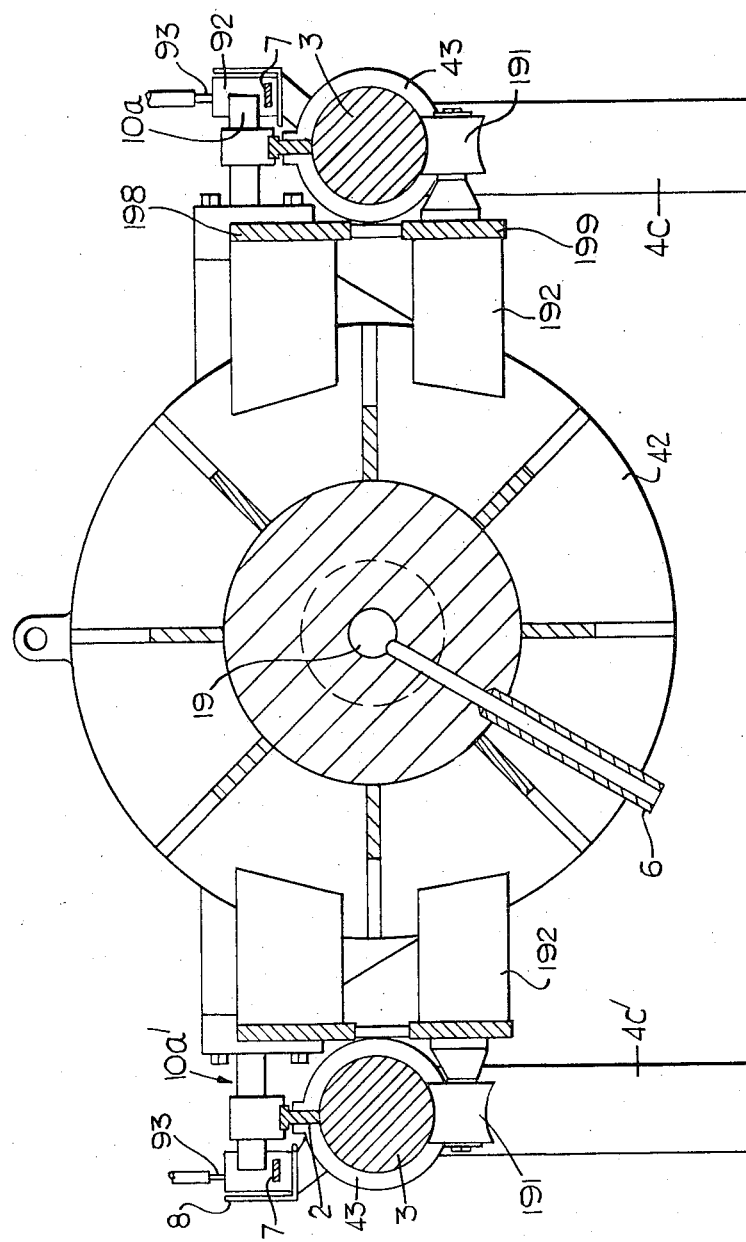
FIG. 12 is a diagrammatic section along the lines 12—12 of FIG. 1.

Referring next to FIG. 12, there is shown a diagrammatic section along the lines 12—12 of FIG. 1. In this figure, there may be seen the tie bars 3 on either side of the plate press to which are attached, by clamps 43, the plate support rails 2. Beneath the tie bars 3 are located rollers 191; these are attached, via plates 198 and 199 and via on extension frame 192, to the cross head member 42. The pipe 6 communicates with a central aperture in the cross head member 42 which in turn communicates with the central apertures 19 of the filter plate units 1a et seq. Two extension members 10a and 10a' are visible in a position in which they are co-operating with the pawls 92 of the devices 9. The chain 7, which drives the devices 9, is visible within the L-shaped support member 8.

Figure 13:
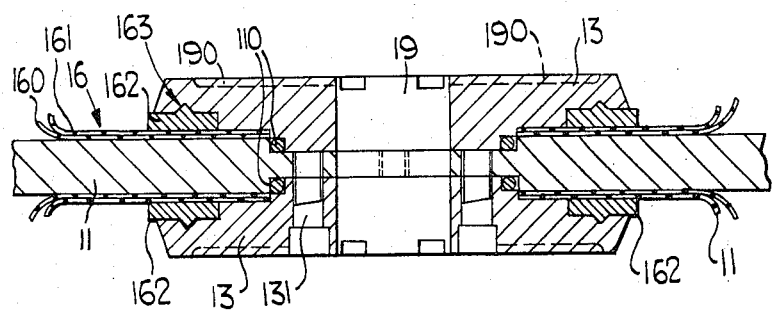
FIG. 13 is an enlarged view of an alternative design of the part shown in FIG. 11.

Referring next to FIG. 13, there is shown part of an embodiment of a filter plate unit in which a part of filter plate 11 extends to the perimeter of the central apperture 19. In this embodiment, the hub members 13 are bolted independently of each other by bolts such as that at 131 to the filter plate 11. This arrangement effectively renders the two sides of the filter plate unit operationally independent. The hub members 13 are provided with four superficial radial grooves 190 and with V-shaped grooves 163 on that surface thereof which abuts the resilient ring seals 162. The groove 163 assists in holding the seals 162 in position, thereby preventing leakage of the mmaterial being filter pressed. In this embodiment there are provided the O-ring seals 110 in captive grooves between the hub members 13 and the filter plate 11.

The operation of the filter press shown in FIG. 1 will now be described with reference to the drawings.

The filter plate units 1a et seq. are held together by pressure from the hydraulic ram 5 which bears against the cross head member 42. The cross head member 42 is prevented from moving in a vertical plane by the arrangement of the rollers 191, the plates 198 and 199 and the extension frame 192 (see FIG. 12). The material which is to be filter pressed, for example an aqueous slurry of a pigment, is fed under pressure, which is initially up to 100–150 pounds per square inch, to the tube 6 whence it passes through the central aperture of the cross head member 42 into a duct which is constituted by the central apertures 19 of the inner spacing means of the filter plate units. The material passes under pressure from the aperture 19 through channels formed by the co-operation of the superficial radial grooves 190 of adjacent inner spacing means 13, into the cavities 20 between adjacent filter plates. The pressure is gradually allowed to build up so that a pressure of 100–150 p.s.i. is not exceeded for a period of about three minutes during which time a thin layer of filtered material builds up on the filter element. After about 3 minutes, the pumping pressure is increased to a value in the range of from 200–1,500 p.s.i. over a period of about 2 minutes. This arrangement permits the material which is to be filter pressed to be fed rapidly into each cavity; because of this rapid filling of each cavity, a comparatively high pressure feed pumping can be established rapidly whereas, with conventional plate filter presses, a gradual pressure build-up of the material to be filter pressed is necessary in order to avoid uneven deposition of filter cake and consequent distortion of the filter elements. The hydraulic ram exerts a pressure on the series of filter plate units 1a et seq, through the crosshead member 42, which pressure is sufficiently high to prevent leakage of liquid from the filter plate units. The holding force which the ram must exert on a 36 inch diameter filter plate unit with an internal (i.e. pumping) pressure of about 1,000 pounds per square inch (p.s.i.) is of the order of 450 tons. Filtrate passes, under the pumping pressure, through the filter elements 16 and is collected at drainage ports 18 in the member 180 from which it passes, through channel 181 within the body of the filter plate 11, to the port 182 on the periphery of the filter plate (see FIG. 8). During the filtration, the backing cloth 160 acts as a pressure mask and prevents the filter cloth from entering the drainage ports 18. Filter cake builds up on the filter element 16 and eventually fills or substantially fills the cavities 20. The circular captive O-ring seals in the surfaces of the rear end member 41 and the cross head member 42 are of a diameter which is larger than that of the apertures 19 and co-operate with the end plates 111 of the stack of filter plate units to prevent leakage of liquid therefrom. When the pressure filtration is completed the pumping pressure and the pressure of the hydraulic ram are released, the cross head member 42 is retracted thereby removing the end plate, and the filter cake formed between the end plate and the first filter plate of the series of filter plate units is released by means of the combined filter cake and filter plate unit release devices 9. The hydraulically driven motor 70 is operated by the cam controlled switch unit 71 and drive both devices 9 from their inoperative positions at the same end of the filter press as the hydraulic ram 5 and at which the pawls 92 are held outwardly from the central axis of the plate filter press by rails 44 towards that filter plate unit which is closest to the cross head member 42 in the series of filter plate units. The drive pressure of the devices 9 is approximately 2,000–2,500 p.s.i. The rails 44 are sufficiently long to hold the pawls 92 away from the extension member of the front end plate 111, which plate is secured to the cross head member 42, when the device 9 moves away from the cross head member thereby preventing the pawls 92 from engaging the extension member of the front end plate 111. The inward facing surface of the pawl 91 of each device 9 first contacts and is forced, by the action of the extension member 10a of the first filter plate 1a, to move against the action of spring 97 in a counterclockwise direction (as seen FIG. 2) about its pivot 991. Just before the end of the pawl 91 of each device 9 has passed the extension member 10a the free end of the pawl 91 of each device 9 is fully biased outwardly from the filter plate unit 1a against the action of the spring 97. As the inward facing surface of the pawl 91 of each device 9 reaches that end of the extension member 10a remote from the crosshead member 42, the pawl 92 moves, under the action of the spring 97, in a clockwise direction (as seen in FIG. 2) about its pivot 991 thereby engaging the extension member 10a in the open end of the pawl 91 of each device 9. At the same time, the free end of the pawl 92 of each device 9 engages that end of the side extension member 10a closest to the cross head member 42, the hydraulic drive pressure to the chain 7 ensuring a face-to-face air-tight contact between the pawl 92 and the side extension member 10a. With the pawls 91 and 92 in this position, the compressed air outlet 90 in the pawl 92 and the compressed air inlet, in the form of first port 100, in the extension member 10a cooperate to complete a compressed air flow line. The cam controlled switch unit then actuates the release of two successive first blasts, followed by two successive second blasts, of compressed air; the first blasts of compressed air are supplied to the pawl 92 of one of the two devices 9 so that compressed air enters the first port 100 of the extension member 10a of the filter plate unit 1a, passes through the duct 14a and into the member 150 whence it issues from the second port 15a to release the filter cake held on the filter element 16, which then drops out of the press; and the second blasts of compressed air are supplied to the pawl 92 of the other of the two devices 9 so that compressed air enters the first 100 of the extension member 10a' of the filter plate unit 1a, passes through the duct 14a' and into the member 150 whence it issues from the second port 15a' and thereby separates the filter plate from the next adjacent plate in the stack. The initial blast of both the first and second blasts of compressed air is at a relatively high pressure while the succeeding blast of both the first and second blasts of compressed air is at a relatively low pressure. The resilient ring seals 162 serve to reduce wear of the filter element when it flexes on release of filter cake. The direction of the chain drive is then reversed and the two devices 9, with the two extension members 10a and 10a' of the first filter plate 1a engaged by the pair of pawls 91, move the first filter plate to a position adjacent to the cross head member 42. As the pawls 92 reach this position, they are biased outwardly from the filter plate unit by contacting the extension member on each side of the end plate 111. The cam controlled switch unit then reverses the chain drive once more and the devices are moved away from the cross head member 42 until the two pairs of pawls engage the side extension members of the next filter plate 1b in the manner described above. The sequence is then repeated until all the filter cakes have been freed and all the filter plates in the series have been separated from one another and moved towards the cross head member 42. at this stage, when the two devices 9 move in a direction away from the cross head member 42, they reach the end of their travel and contact the stop members and projections thereof which are attached to the rear end plate 111 which is secured to the rear end member 41; these stop members and their projections close and lock the pawl 91 of each device 9 in a position relatively remote from the extension members 10 (see FIGS. 2, 3 and 4). The chain drive is then once more reversed, and the devices 9 travel back towards their inoperative position at the same end of the plate filter press as the hydraulic ram 5. The extension members 10 do not hinder this movement since the inward facing surface of the pawl 92 makes contact with, and is moved against the action of spring 98 by, the extension members 10 so that the pawl 92 is caused to pivot in a clockwise direction (as seen in FIG. 2) about its pivot 992. This motion continues until the two devices 9 reach their inoperative position which is a position against the stop member at the end of the support bar 8 remote from the rear end member 41. A projection, e.g. on the stop member, at the end of the support bar 8 remote from the back end member 41 is located so that, when the two devices 9 contact the stop member, the projection actuates the locking bars which in turn move the actuating pin 96 in a direction such that the channelled plate 94 is moved away from the locking pin 95 so as to release the pawl 91 of each of the two devices 9 in readiness for the succeeding cycle. Thereafter, the filter plates which have been separated are moved by the hydraulic ram 5 to the other end of the plate filter press and are resealed by the pressure of the hydraulic ram 5. The succeeding cycle can then be recommenced. The devices 9 remain in their inoperative position until the filtration step of the succeeding cycle is completed.

In practising the process of the invention, it has been found that fine materials e.g. paper coating clays should preferably be made into a slurry having a specific gravity of not more than 1.350, and more preferably in the range of from 1.200–1.250. A pumping pressure of about 1,000 p.s.i. has been used successfully with such materials.

The invention will be further illustrated by the following Examples:

EXAMPLE 1

A clay slurry was fed under pressure to a 100-plate (98 cake) filter press of the type shown in the accompanying drawings and was subjected to a process in accordance with the invention, for a time sufficient to allow maximum filter cake deposition in each filter plate unit cavity (as indicated by the filtrate flow) whereafter the pumping was stopped and the plate separation and filter cake discharge cycle was commenced. The clay was a paper coating kaolin (viz. DINKIE 'A' CLAY - DINKIE is a Registered Trade Mark) having a particle size distribution such that 75% of the particles thereof had an equivalent spherical diameter smaller than 2 microns; 0.5% of the particles thereof had an equivalent spherical diameter greater than 10 microns; and not more than 0.01% of the particles thereof were larger than 53 microns. The clay slurry had a specific gravity of 1.250 (i.e. approximately 32% by weight of solids). The filtering pressure, i.e. the maximum pumping pressure, was 800 p.s.i. and the time of pressing was 40 minutes. At the end of this time, filter cakes up to 1½ inch thickness were obtained which had a 25% w/w moisture content (75% by weight of solids).

EXAMPLE 2

The method of Example 1 was repeated, using the same clay but as a slurry of specific gravity 1.080 (i.e. approximately 12% by weight of solids). The filtering pressure was 775 p.s.i. and the time of pressing was 2 hours. At the end of this time, filter cakes up to 1½ inch thickness were obtained which had a 25% w/w moisture content (75% by weight of solids).

EXAMPLE 3

A clay slurry was fed to an 18-plate (16 cake filter press of the type shown in the accompanying drawings and was subjected to a process in accordance with the invention for a time sufficient to allow maximum filter cake deposition in each filter plate unit cavity (as indicated by the filtrate flow) whereafter the pumping was stopped and the plate separation and filter cake discharge cycle was commenced. The clay was a ceramic grade kaolin having a particle size distribution such that 36% by weight of the particles thereof had an equivalent spherical diameter smaller than 2 microns; 30% by weight of the particles thereof had an equivalent spherical diameter greater than 10 microns; and not more than 0.30% by weight of the particles thereof were larger than 53 microns. The clay slurry had a specific gravity of 1.300 (i.e. approximately 37% by weight of solids). The filtering pressure, i.e. the maximum pumping pressure, was 900 p.s.i. and the time of pressing was 25 minutes. At the end of this time, filter cakes up to 1½ inch thickness were obtained which had a 20% w/w moisture content (80% by weight of solids).

EXAMPLE 4

The method of Example 3 was repeated, but the clay used was a paper filling grade kaolin having a particle size distribution such that 20% by weight of the particles thereof had an equivalent spherical diameter smaller than 2 microns; 25% by weight of the particles thereof had an equivalent spherical diameter greater than 10 microns; and not more than 0.03% by weight of the particles thereof were larger than 53 microns. The clay slurry had a specific gravity of 1.250 (i.e. approximately 32.2% by weight of solids). The filtering pressure was 1,000 p.s.i. and the time of pressing was 30 minutes. At the end of this time, filter cakes up to 1½ inch thickness were obtained which had a 22.0% w/w moisture content (78% by weight of solids).

EXAMPLE 5

The method of Example 4 was repeated with the same clay, but as a slurry of specific gravity 1.350 (i.e. approximately 41.8% by weight of solids). The filtering pressure was 1,000 p.s.i. and the time of pressing was 20 minutes. At the end of this time, filter cakes up to 1½ inch thickness were obtained which had a 21% w/w moisture content (79% by weight of solids).

We claim:

1. A plate filter press which includes (i) a carriageway, (ii) a series of filter plate units which are supported on and adapted to be moveable along said carriageway, wherein each filter plate unit includes (a) a filter having members thereon forming an annular recess on a face thereof, (b) a filter element secured to said face of the filter plate, (c) one or more ducts connecting the filter element on said face of the filter plates with an inlet at one side of the filter plate unit, (d) means for introducing a material which is to be filter pressed into cavities formed by the co-operation of the annular recess of each filter plate unit with a contiguous filter plate unit; and (e) two extension members, located one on each side of the filter plate unit, each of which is provided with an air inlet and is adapted to slide along said carriageway and to support the weight of the filter plate unit; (iii) means for applying pressure to material within said cavities whereby, in use, liquid can be expressed from the material in said cavities through said filter element; (iv) a conveyor system extending parallel with said carriageway; (v) filter cake release means adapted to be conveyed along said conveyor system and to connect the air inlets of each filter plate unit with a supply of compressed air so that a filter cake can be dislodged from one or more of the walls of the cavity in which it has been formed; and (vi) a filter plate unit-release device adapted to be conveyed along said conveyor system and to separate each filter plate unit from the adjacent filter plate unit.

2. A plate filter press as claimed in claim 1 wherein the filter plate of each filter plate unit has members thereon forming an annular recess on both faces thereof and wherein a filter element is secured to both faces of the filter plate.

3. A plate filter press as claimed in claim 1 wherein each air inlet communicates, via a duct within the body of its respective filter plate, with an outlet in one face of the filter plate, the arrangement being such that the air inlet in one of the extension members of each filter plate unit communicates with an outlet in one face of the filter plate, and the air inlet in the other extension member of the filter plate unit communicates with an outlet in the other face of the filter plate.

4. A plate filter press as claimed in claim 1, wherein there is provided a conveyor system and a filter plate unit-release device on both sides of the plate press.

5. A plate filter press as claimed in claim 1, wherein the filter cake release means and the filter plate unit-release device are combined in a single unit.

6. A plate filter press as claimed in claim 1, wherein the means for supplying a material to be filter pressed to the cavities within the series of filter plate units comprises an axial duct within the series of filter plate units formed by the co-operation of the central apertures of contiguous filter plate units in the series and, extending therefrom, a plurality of superficial grooves formed in the surface of that part of the filter plate located between the central aperture thereof and the annular recess thereof, the superficial grooves forming passageways between said axial ducts and said cavities.

7. A plate filter press as claimed in claim 6, wherein said superficial grooves are formed on both faces of the filter plate unit.

8. A plate filter press as claimed in claim 7, wherein adjacent filter plate units are disposed so that each superficial groove of one filter plate unit can co-operate with the corresponding superficial groove of a contiguous filter plate unit to form a duct of symmetrical cross-section.

9. A plate filter press which includes (i) a carriageway, (ii) a series of filter plate units which are supported on and adapted to move along said carriageway, wherein each filter plate unit includes (a) a filter plate having members thereon forming an annular recess on both faces thereof, the annular recess of each filter plate unit co-operating with a contiguous filter plate unit to form a cavity in which a material to be filter pressed can be treated, (b) a filter element secured to said both faces of the filter plate, (c) means for supplying a material to be filter pressed to said cavity, (d) means for conveying filtrate from the filter element to the exterior of the filter plate unit, and (e) a central aperture; (iii) means for applying pressure to material within said cavities whereby, in use, liquid can be expressed from the material in said cavity through the filter elements; (iv) a conveyor system extending parallel with said carriageway; (v) filter cake release means adapted to be conveyed along said conveyor system and to dislodge each filter cake from one or more of the walls of the cavity in which it has been formed; and (vi) a filter plate unit-release device adapted to be conveyed along said conveyor system and to separate each filter plate unit from its adjacent filter plate unit, wherein the means for supplying a material to be filter pressed to the cavities within the series of filter plate units comprises an axial duct within the series of filter plate units formed by the co-operation of the central apertures of contiguous filter plate units in the series and, extending therefrom, a plurality of superficial grooves formed in the surface of that part of the filter plate, on both faces thereof, located between the central aperture thereof and the annular recess thereof, the superficial grooves forming passageways between said axial ducts and said cavities, and wherein adjacent filter plate units are disposed so that each superficial groove of one filter plate unit can co-operate with the corresponding superficial groove of a contiguous filter plate unit to form a duct of symmetrical cross-section.

10. A plate filter press as claimed in claim 9, wherein each filter plate unit is provided with outer spacing means disposed peripherally of its respective filter plate, and inner spacing means disposed centrally of said filter plate around the central aperture of the filter plate unit, the annular gap between the inner spacing means and the outer spacing means constituting the annular recess of the filter plate unit.

11. A plate filter press as claimed in claim 9, wherein each filter plate unit of the series includes two extension members, located one on each side of the filter plate unit, which are adapted to slide along said carriageway and to support the weight of the filter plate unit.

12. A plate filter press as claimed in claim 9, wherein there is provided a conveyor system and a filter plate unit-release device on both sides of the plate filter press.

13. A plate filter press as claimed in claim 9, wherein the filter cake release means and the filter plate unit-release device are combined in a single unit.

14. A plate filter press which includes (i) a carriageway, (ii) a series of filter plate units which are supported on and adapted to be moveable along said carriageway, wherein each filter plate unit includes (a) a filter plate having members thereon forming an annular recess on both faces thereof, (b) a filter element secured to both faces of the filter plate, (c) one or more ducts connecting said filter element with an inlet at one side of the filter plate unit, (d) means for introducing a material which is to be filter pressed into cavities formed by the co-operation of the annular recesses of each filter plate unit with a contiguous filter plate unit, and (e) two extension members, located one on each side of the filter plate unit, which are adapted to slide along said carriageway and to support the weight of the filter plate unit and each of which is provided with an air inlet; (iii) means for applying pressure to material within said cavities whereby, in use, liquid can be expressed from the material in said cavities through said filter elements; (iv) a conveyor system extending parallel with said carriageway; (v) filter cake release means adapted to be conveyed along said conveyor system and to connect the air inlet of each filter plate unit with a supply of compressed air so that a filter cake can be dislodged from one or more walls of the cavity in which it has been formed, and (vi) a filter plate unit-release device adapted to be conveyed along said conveyor system and to separate each filter plate unit from the adjacent filter plate unit.

15. A plate filter press as claimed in claim 14, wherein each air inlet communicates, via a duct within the body of its respective filter plate, with an outlet in one face of the filter plate, the arrangement being such that the air inlet in one of the extension members of each filter plate unit communicates with an outlet in one face of the filter plate, and the air inlet in the other extension member of the filter plate unit communicates with an outlet in the other face of the filter plate.

16. A plate filter press as claimed in claim 15, wherein said outlets are in the form of one or more ports which are located in one or more plug members within the body of the filter plate.

17. A plate filter press as claimed in claim 15, wherein the filter plate unit-release device includes a first pawl and a second pawl each of which are pivoted at one end thereof and are free at the other end thereof, the pawls being constructed and arranged so that their free ends confront one another and in one position thereof they can engage with an extension member of a filter plate unit in a manner such that movement of the pawls along the conveyor system can effect movement of the filter plate unit along the carriageway.

18. A plate filter press as claimed in claim 17, wherein one of said first pawl and said second pawl is adapted to receive a compressed air line and is constructed and arranged so that, when it co-operates with an extension member of a filter plate unit, compressed air can pass through the pawl into the air inlet in said extension member.

* * * * *